(12) United States Patent
Kumar

(10) Patent No.: US 7,247,999 B2
(45) Date of Patent: Jul. 24, 2007

(54) DIMMER FOR USE WITH A THREE-WAY SWITCH

(75) Inventor: Russikesh Kumar, Bethlehem, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 44 days.

(21) Appl. No.: 11/125,045

(22) Filed: May 9, 2005

(65) Prior Publication Data
US 2006/0250093 A1 Nov. 9, 2006

(51) Int. Cl.
*G05F 1/00* (2006.01)
(52) U.S. Cl. .................. 315/291; 315/307; 307/115
(58) Field of Classification Search ........ 315/307–308, 315/291–297, 209 R, 246, 360, DIG. 4; 307/112–115, 307/140, 82–84, 127
See application file for complete search history.

(56) References Cited

U.S. PATENT DOCUMENTS

| | | | | |
|---|---|---|---|---|
| 4,259,619 A | | 3/1981 | Wall | 315/361 |
| 4,334,171 A | | 6/1982 | Parman et al. | 315/199 |
| 4,563,592 A | | 1/1986 | Yuhasz et al. | 307/115 |
| 4,689,547 A | | 8/1987 | Rowen et al. | 323/239 |
| 4,745,351 A | | 5/1988 | Rowen et al. | 323/239 |
| 4,761,722 A | * | 8/1988 | Pruitt | 363/17 |
| RE33,504 E | | 12/1990 | Yuhasz et al. | 307/115 |
| 5,017,837 A | | 5/1991 | Hanna et al. | 315/136 |
| 5,066,898 A | * | 11/1991 | Miller et al. | 315/362 |
| 5,248,919 A | | 9/1993 | Hanna et al. | 315/291 |
| 5,262,678 A | | 11/1993 | Flowers et al. | 307/125 |
| 5,359,231 A | | 10/1994 | Flowers et al. | 307/125 |
| 5,399,940 A | | 3/1995 | Hanna et al. | 315/129 |
| 5,519,263 A | | 5/1996 | Santana, Jr. | 307/115 |
| 5,798,581 A | * | 8/1998 | Keagy et al. | 307/115 |
| 5,821,699 A | * | 10/1998 | Moisin | 315/291 |
| 5,920,156 A | * | 7/1999 | Carson et al. | 315/317 |
| 6,100,653 A | * | 8/2000 | Lovell et al. | 315/307 |
| 6,710,553 B2 | * | 3/2004 | Logan | 315/291 |
| 7,002,264 B2 | * | 2/2006 | Logan | 307/115 |
| 2004/0032222 A1 | * | 2/2004 | Green | 315/291 |
| 2006/0012315 A1 | * | 1/2006 | McDonough et al. | 315/291 |

* cited by examiner

*Primary Examiner*—Trinh Dinh
*Assistant Examiner*—Tung Le
(74) *Attorney, Agent, or Firm*—Mark E. Rose

(57) ABSTRACT

A smart dimmer for controlling the intensity of a lighting load from a source of AC power is operable to replace one of the three-way switches in a standard three-way lighting system without the need to replace the other three-way switch with a unique accessory switch. A simple rewiring is needed in the wallbox of the remaining three-way switch. In the resulting three-way lighting system, the smart dimmer is always coupled between the lighting load and the source and the remaining three-way switch is coupled between either of the load terminals of the dimmer and an accessory terminal of the dimmer. The remaining three-way switch acts to either couple or decouple an AC voltage from the accessory terminal. The smart dimmer is operable to detect a change in the state at the accessory terminal and toggle the lighting load on or off as a result of the change in state.

20 Claims, 7 Drawing Sheets

DIMMER FOR USE WITH A THREE-WAY SWITCH

FIELD OF THE INVENTION

The present invention relates to a wall mountable dimmer switch that can be wired for use with a three-way switch without the need to buy a special dimmer or switch. In particular, the present invention relates to a dimmer switch that can be substituted for either a line-side three-way switch or a load-side three-way switch in lighting circuit having two points of control, without the need to change or replace the other three-way switch.

BACKGROUND OF THE INVENTION

Three-way switch systems for use in controlling loads in buildings, such as lighting loads, have long been known in the art. The switches used in these systems are wired to the building's alternating-current (AC) wiring system, are subjected to AC source voltage, and carry full load current, as opposed to low-voltage switch systems that operate at low voltage and low current and communicate digital commands (usually low-voltage logic levels) to a remote controller that controls the level of AC power delivered to the load in response to the commands. Thus, as used herein, the terms "three-way switch" and "three-way system" mean such switches and systems that are subjected to the AC source voltage and carry the full load current.

In a three-way switch system, there are two three-way switches for controlling a single load, and each switch is fully operable to independently control the load irrespective of the status of the other switch. In such a system, one three-way switch must be wired at the AC source side of the system (sometimes called "line side"), and the other three-way switch must be wired at the load side of the system.

FIG. 1A shows a standard three-way switch system 100, which includes two three-way switches 102, 104. The switches 102, 104 are connected between an AC power source 106 and a lighting load 108. When switches 102, 104 are both in position A (or both in position B), the circuit is complete and the lighting load 108 is energized. When switch 102 is in position A and switch 104 is in position B (or vise versa), the circuit is not complete and the lighting load 108 does not light up.

Three-way dimmer switches that replace three-way switches are well known in the art. An example of a three-way dimmer switch system 150 including one prior art three-way dimmer switch 152 and one three-way switch 104 is shown in FIG. 1B. The three-way dimmer switch 152 simply includes a dimmer circuit 152A and a three-way switch 152B. A typical, AC, phase-control dimmer 152 regulates the amount of energy supplied to the lighting load 108 by conducting for some portion of each half-cycle of the AC waveform, and not conducting for the remainder of the half-cycle. Because the dimmer switch 152 is in series with the lighting load 108, the longer the dimmer 152 conducts, the more energy will be delivered to the lighting load 108. Where the lighting load 108 is a lamp, the more energy delivered to the lighting load 108, the greater the light intensity level of the lamp. In a typical dimming scenario, a user may adjust a control to set the light intensity level of the lamp to a desired light intensity level. The portion of each half-cycle for which the dimmer conducts is based on the selected light intensity level. Since two dimmer circuits cannot be wired in series, the three-way dimmer switch system 150 can only include one three-way dimmer switch 152, which can be located on either the line side or the load side of the system.

Three-way dimming systems that employ a "smart" dimmer switch and a specially designed auxiliary (remote) switch that permits the dimming level to be adjusted from multiple locations have been developed. A smart dimmer is one that includes a microcontroller or other processing means for allowing an advanced set of control features and feedback options to the end user. To power the microcontroller, smart dimmers include power supplies, which draw a small amount of leakage current through the lighting load each half-cycle when the FETs are non-conducting. The power supply uses this small amount of current to charge a capacitor and develop a direct-current (DC) voltage to power the microcontroller. An example of a multiple location lighting control system, including a wall mountable smart dimmer switch and wall mountable remote switches for wiring at all locations of a multiple location switch system is disclosed in commonly assigned U.S. Pat. No. 5,248,919, issued on Sep. 28, 1993, entitled "Lighting Control Device", which is herein incorporated by reference in its entirety.

Referring to the system 150 of FIG. 1B, since no load current flows through the dimmer circuit 152A of the three-way dimmer switch 152 when the circuit between the supply 106 and the lighting load 108 is broken by either three-way switch 152B or 104, the dimmer switch 152 is not able to include a power supply and a microcontroller. Thus, the dimmer switch 152 is not able to provide the advanced set of features of a smart dimmer to the end user.

FIG. 2 shows an example multiple location lighting control system 200 including one wall mountable smart dimmer switch 202 and one wall mountable remote, or accessory, switch 204. The dimmer switch 202 has a Hot (H) terminal, for receipt of an AC source voltage provided by an AC power supply 206, and a Dimmed Hot (DH) terminal, for providing a dimmed-hot voltage to a lighting load 208. The remote switch 204 is connected in series with the DH terminal of the dimmer switch 202 and the lighting load 208 and simply passes the dimmed-hot voltage through to the lighting load.

The dimmer switch 202 and the remote switch 204 both have actuators to allow for raising, lowering, and toggling on/off the lighting load 208. The dimmer switch 202 is responsive to actuation of any of these actuators to alter the dimming level (or power the lighting load 208 on/off) accordingly. In particular, actuation of an actuator at the remote switch 204 causes an AC control signal, or partially rectified AC control signal, to be communicated from that remote switch 204 to the dimmer switch 202 over the wiring between the Accessory Dimmer (AD) terminal of the remote switch 204 and the AD terminal of the dimmer switch 202. The dimmer switch 202 is responsive to receipt of the control signal to alter the dimming level or toggle the load on/off. Thus, the load can be fully controlled from the remote switch 204.

The user interface of the dimmer switch 202 of the multiple location lighting control system 200 is shown in FIG. 3. As shown, the dimmer switch 202 may include a faceplate 310, a bezel 312, an intensity selection actuator 314 for selecting a desired level of light intensity of a lighting load 208 controlled by the dimmer switch 202, and a control switch actuator 316. Faceplate 310 need not be limited to any specific form, and is preferably of a type adapted to be mounted to a conventional wall box commonly used in the installation of lighting control devices. Likewise, bezel 312 and actuators 314 and 316 are not limited to any specific form, and may be of any suitable design that permits manual actuation by a user.

Actuation of the upper portion 314A of actuator 314 increases or raises the light intensity of lighting load 208, while actuation of lower portion 314B of actuator 314 decreases or lowers the light intensity. Actuator 314 may control a rocker switch, two separate push switches, or the like. Actuator 316 may control a push switch, though actuator 316 may be a touch-sensitive membrane or any other suitable type of actuator. Actuators 314 and 316 may be linked to the corresponding switches in any convenient manner. The switches controlled by actuators 314 and 316 may be directly wired into the control circuitry to be described below, or may be linked by an extended wired link, infrared link, radio frequency link, power line carrier link, or otherwise to the control circuitry.

Dimmer switch 202 may also include an intensity level indicator in the form of a plurality of light sources 318, such as light-emitting diodes (LEDs). Light sources 318 may be arranged in an array (such as a linear array as shown) representative of a range of light intensity levels of the lighting load being controlled. The intensity levels of the lighting load may range from a minimum intensity level, which is preferably the lowest visible intensity, but which may be zero, or "full off," to a maximum intensity level, which is typically "full on." Light intensity level is typically expressed as a percent of full intensity. Thus, when the lighting load is on, light intensity level may range from 1% to 100%.

A simplified block diagram of the dimmer switch 202 and the remote switch 204 of the multiple location lighting control system 200 is shown in FIG. 4A. The dimmer switch 202 employs a controllably conductive device, such as two field-effect transistors (FETs) 420, 422 provided in anti-serial connection between the Hot terminal H and the Dimmed Hot terminal DH, to control the current through, and thus the intensity of, the lighting load 208. The first FET 420 conducts during the positive half-cycle of AC waveform and the second FET 422 conducts during the negative half-cycle of the AC waveform. The gates of FETs 420, 422 are connected to a gate drive circuit 424, which provides control inputs to the FETs in response to command signals from a microcontroller 426. Alternatively, the controllably conductive device could be implemented as another type of semiconductor switch, such as a triac or a silicon-controlled rectifier (SCR).

Microcontroller 426 may be any suitable processing device, such as a programmable logic device (PLD), a microprocessor, or an application specific integrated circuit (ASIC). Microcontroller 426 generates command signals to a plurality of LEDs 418 for feedback to the user of the dimmer switch 202. The microcontroller 426 receives inputs from a zero-crossing detector 430 and a signal detector 432.

A power supply 428 generates two DC output voltages $V_{CC1}$ and $V_{CC2}$. The first output voltage $V_{CC1}$ has a magnitude appropriate to power the microcontroller 426 and other low-voltage circuitry (such as 3.3 $V_{DC}$ or 5 $V_{DC}$). The second output voltage $V_{CC2}$ has a magnitude greater than $V_{CC1}$ (approximately 8 $V_{DC}$) and is provided to the gate drive circuit 424 for driving the FETs 420A, 420B.

The zero-crossing detector 430 determines the zero-crossing points of the input 120V, 60 Hz AC waveform from the AC power supply 206. The zero-crossing information is provided as an input to microcontroller 426. Microcontroller 426 provides the gate control signals to operate FETs 420, 422 to provide voltage from the AC power supply 206 to the lighting load 208 at predetermined times relative to the zero-crossing points of the AC waveform.

Generally, two techniques are used for controlling the power supplied to the lighting load 208: forward phase control dimming and reverse phase control dimming. In forward phase control dimming, the FETs 420, 422 are turned on at some point within each AC line voltage half-cycle and remains on until the next voltage zero-crossing. Forward phase control dimming is often used to control energy to a resistive or inductive load, which may include, for example, a magnetic low-voltage transformer or an incandescent lamp. In reverse phase control dimming, the FETs 420, 422 are turned on at the zero-crossing of the AC line voltage and turned off at some point within each half-cycle of the AC line voltage. Reverse phase control is often used to control energy to a capacitive load, which may include, for example, an electronic low-voltage transformer.

Signal detector 432 has an input 440 for receiving switch closure signals from momentary switches designated T, R, and L. Switch T corresponds to a toggle switch controlled by switch actuator 316, and switches R and L correspond to the raise and lower switches controlled by the upper portion 314A and lower portion 314B, respectively, of intensity selection actuator 314.

Closure of switch T will connect the input of the signal detector 432 to the DH terminal of the dimmer switch 202 when the FETs 420, 422 are non-conducting, and will allow both positive and negative half-cycles of the AC current to flow through the signal detector. Closure of switches R and L will also connect the input of the signal detector 432 to the DH terminal when the FETs 420, 422 are non-conducting. However, when switch R is closed, current can only flow through the signal detector 432 during the negative half-cycle of the AC power supply 406 because of a diode 434. In similar manner, when switch L is closed, current can only flow through the signal detector 432 during the positive half-cycles because of a diode 436. The duration of switch closures of switches T, R, and L are typically 100-200 milliseconds in length. The signal detector 432 detects when the switches T, R, and L are closed, and provides two separate output signals representative of the state of the switches as inputs to the microcontroller 426. A signal on the first output of the signal detector 432 indicates a closure of switch R and a signal on the second output indicates a closure of switch L. Simultaneous signals on both outputs represent a closure of switch T. The microcontroller 426 determines the duration of closure in response to inputs from the signal detector 432.

The remote switch 204 provides a means for controlling the dimmer switch 202 from a remote location in a separate wall box. The remote switch 204 includes a further set of momentary switches T', R', and L' and diodes 434' and 436'. A wire connection is made between the AD terminal of the remote switch 204 and the AD terminal of the dimmer switch 202 to allow for the communication of actuator presses at the remote switch. The AD terminal is connected to the input 440 of the signal detector 432. The action of switches T', R', and L' in the remote switch 204 corresponds to the action of switches T, R, and L in the dimmer switch 202.

A schematic representation of the signal detector 432 is shown in FIG. 4B. The input 440 if the signal detector 432 is received from the switches T, R, and L and the AD terminal. Two outputs 442 (AD_LOWER) and 444 (AD_RAISE) are provided to the microprocessor 426. When the lower switch L is pressed, current will flow out of the input 440 through a diode D1 and two resistors R1, R2 of the signal detector 432 during the positive half-cycles of the AC power supply 406. When the current flows, a bias voltage will develop across the resistor R2, which will cause a transistor Q1 to begin conducting, thus pulling the output AD_LOWER up to the level of the voltage $V_{CC2}$. A resistor R3 pulls the voltage at the output AD_LOWER down to circuit common during the negative half-cycles. Thus, an active-high control signal that consists of a pulse during each positive half-cycle will be generated at the output AD_LOWER when the switch L is pressed.

When the raise switch R is pressed and the breakdown voltage of a zener diode Z1 is exceeded, current will flow into the input 440 through a diode D2, the zener diode Z1, and two resistors R4, R5 during the negative half-cycles. The zener diode Z1 limits the voltage across the resistors R4, R5 and thus the current through the resistors. A bias voltage produced across resistor R5 when current flows will cause a transistor Q2 to begin conducting and the output AD_RAISE will then be pulled down to circuit common. A resistor R6 is provided to pull the voltage at the output AD_RAISE up to the voltage $V_{CC1}$ during the positive half-cycles. In this case, an active-low control signal that consists of a pulse during each negative half-cycle will be generated at the output AD_RAISE when the switch R is pressed.

When the toggle switch T is pressed, current will flow through the signal detector 632 during both half-cycles and both of the control signals as described above will be generated at the outputs AD_LOWER and AD_RAISE.

When the switches T', R', and L' are pressed on the remote switch 204, the signal detector 432 functions the same as when the switches T, R, and L are pressed. Also, the signal detector 432 will function similarly if the remote switch 204 is located on the line side of the dimmer switch 202. However, when switch L' is pressed in this case, the diode D1 will conduct during the negative half-cycles and the signal at the AD_LOWER output will have pulses during the negative half-cycles. Further, when the switch R' is pressed, the diode D2 will conduct during the positive half-cycles and the signal at the AD_RAISE output will have pulses during the positive half-cycles.

Even though the multiple location lighting control system 200 allows for the use of a smart dimmer switch in a three-way system, it is necessary for the customer to purchase the remote switch 204 along with the smart dimmer switch 202. Often, the typical customer is unaware that a remote switch is required when buying a smart dimmer switch for a three-way system until after the time of purchase when the smart dimmer switch is installed and it is discovered that the smart dimmer will not work properly with the existing three-way switch. Therefore, there exists a need for a smart three-way dimmer switch that may be installed in a three-way system without the need to purchase and install a special remote switch.

SUMMARY OF THE INVENTION

In accordance with the present invention, a novel lighting control system for controlling the intensity of a lighting load from a source of AC power includes a load control device and a maintained switch. The dimmer switch includes two load terminals, a controllably conductive device coupled between the load terminals for carrying current to the load, and an accessory terminal. The load control device is operable to toggle the lighting load between an ON state when the lighting load is illuminated and an OFF state when the lighting load is not illuminated. The maintained switch is coupled between the accessory terminal and either one of the load terminals of the load control device. The maintained switch has a closed state in which the accessory terminal is coupled to either one of the load terminals and an open state in which the accessory terminal is not coupled to either one of the load terminals. The load control device is operable to toggle the lighting load when the maintained switch changes between the open state and the closed state.

In another aspect, the present invention provides a method for controlling the intensity of a lighting load from a source of AC power in a lighting control system comprising a load control device and a maintained switch. The load control device includes two load terminals and an accessory terminal. The maintained switch has a closed state for coupling the accessory terminal to one of the two load terminals and an open state for decoupling the accessory terminal from the load terminal. The steps of the method comprise storing a previous state of the maintained switch, detecting the present state of the maintained switch, and comparing the present state with the previous state, and changing the intensity of the lighting load based on the step of comparing.

DETAILED DESCRIPTION OF THE INVENTION

Figure 1A:
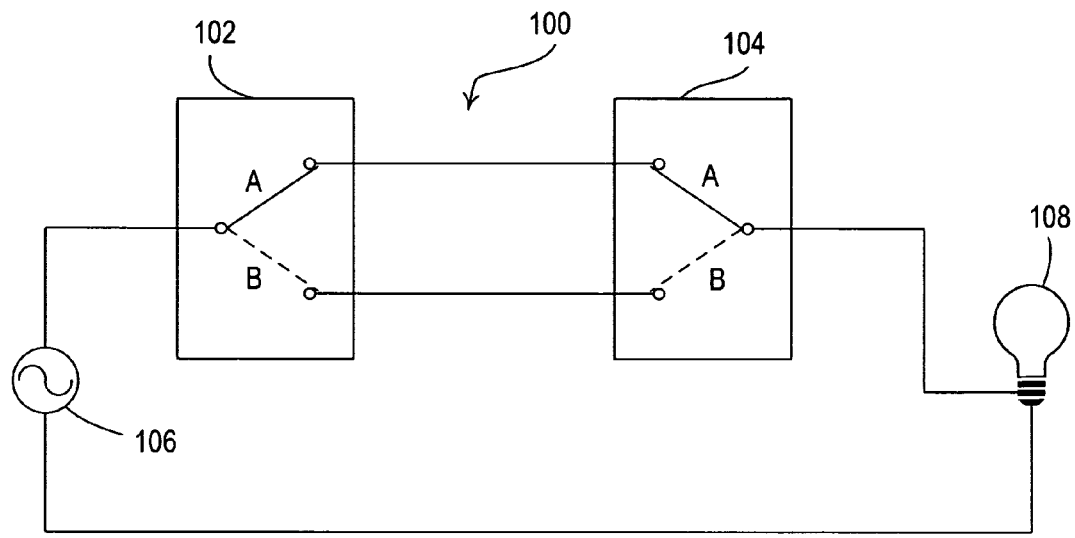
FIG. 1A is a simplified block diagram of a standard three-way switch system.
Figure 1B:
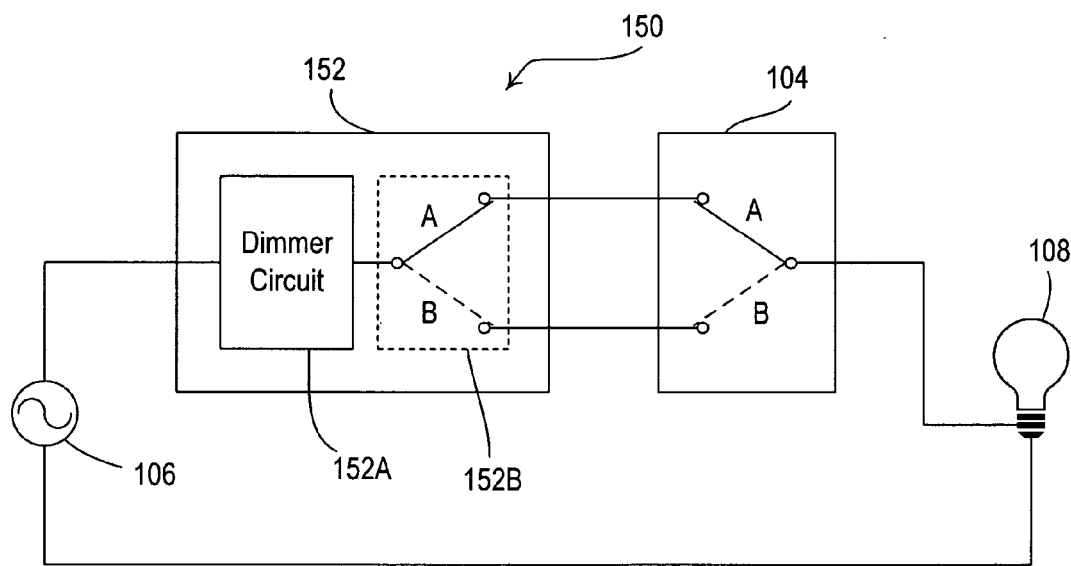
FIG. 1B is a simplified block diagram of a prior art three-way dimmer switch system.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 5:
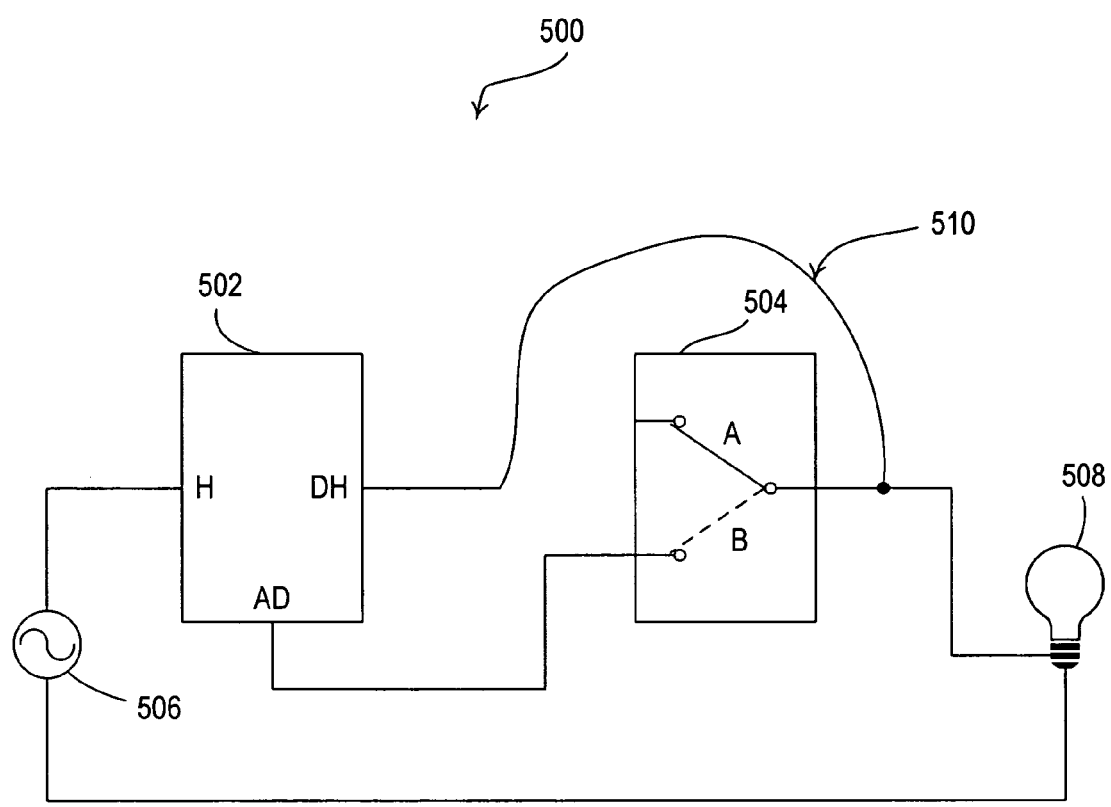
FIG. 5 is a simplified block diagram of the three-way dimmer switch system of the present invention.

Referring to FIG. 5, there is shown a three-way dimmer switch system 500 in accordance with the present invention. The system 500 includes a novel smart three-way dimmer switch 502 and a standard maintained three-way switch 504. There is no need for the installer to purchase a unique remote switch to replace the three-way switch 504. The smart three-way dimmer switch 502 is wired in place of the line-side three-way switch 102 in FIG. 1A and is connected to an AC power source 506. A simple rewiring 510 is required in the wallbox of the three-way switch 504 in order to disconnect the DH terminal of the smart three-way dimmer switch 502 from the first switch position of the three-way switch 504 (position A in FIG. 5) and to connect the DH terminal to the lighting load 508. The other switch position of the three-way switch (position B in FIG. 5) is connected to the AD terminal of the smart three-way dimmer switch 502.

The result is that the smart three-way dimmer switch 502 is always connected between the AC power source 506 and the lighting load 508 independent of the position of three-way switch 504. The three-way switch 504 now operates by either connecting the Dimmed Hot voltage to or disconnecting the Dimmed Hot voltage from the AD terminal on the smart three-way dimmer switch. The smart three-way dimmer switch 502 could also be wired to the load side of system 500 and operation of the three-way switch 504 would connect and disconnect the AC power source voltage to and from the AD terminal on the smart three-way dimmer switch. Also, a two-way switch could be used in place of three-way switch 504 since the first position A is not being used.

Figure 4A:
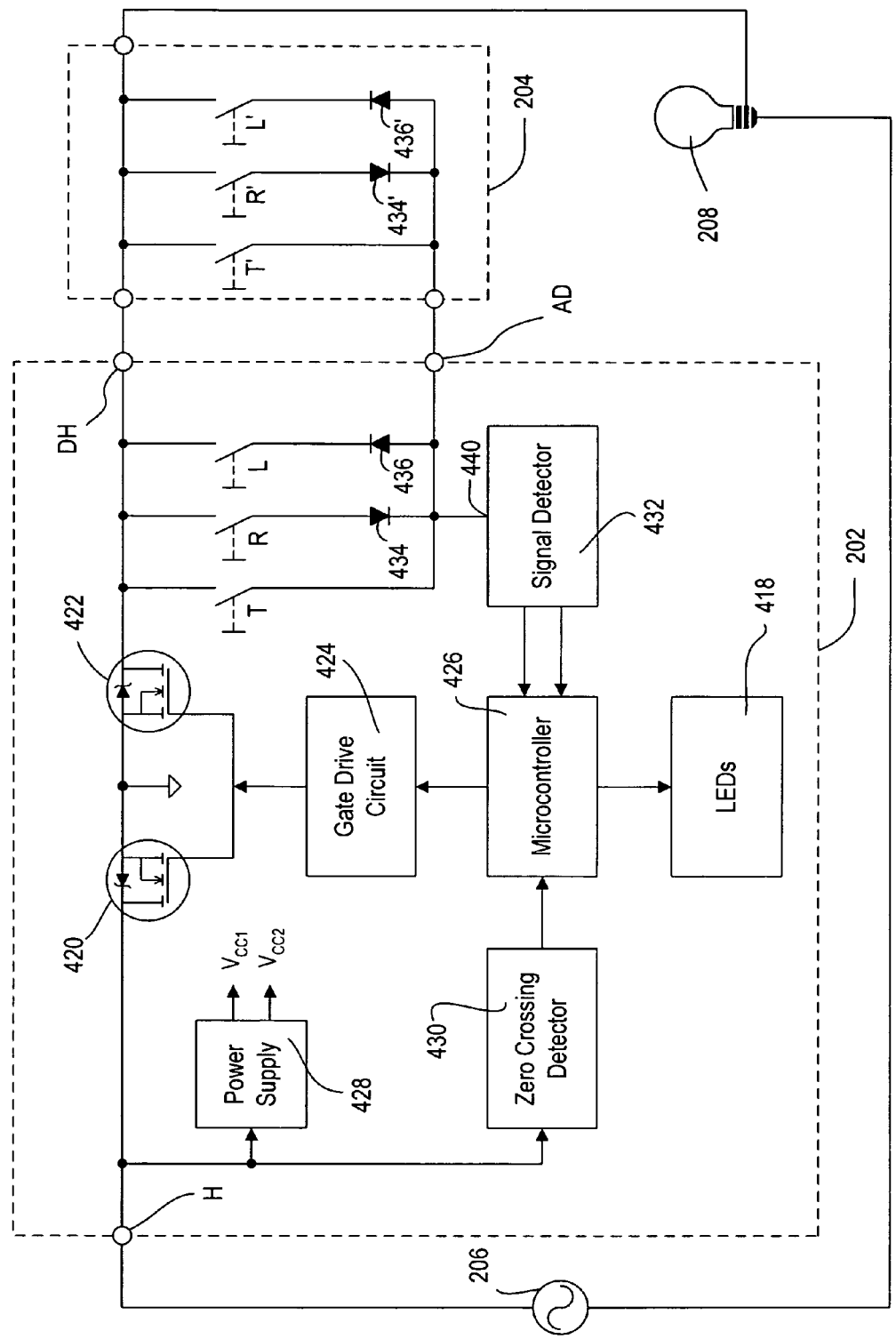
FIG. 4A is a simplified block diagram of the dimmer switch and the remote switch of the multiple lighting control system of FIG. 2.
Figure 4B:
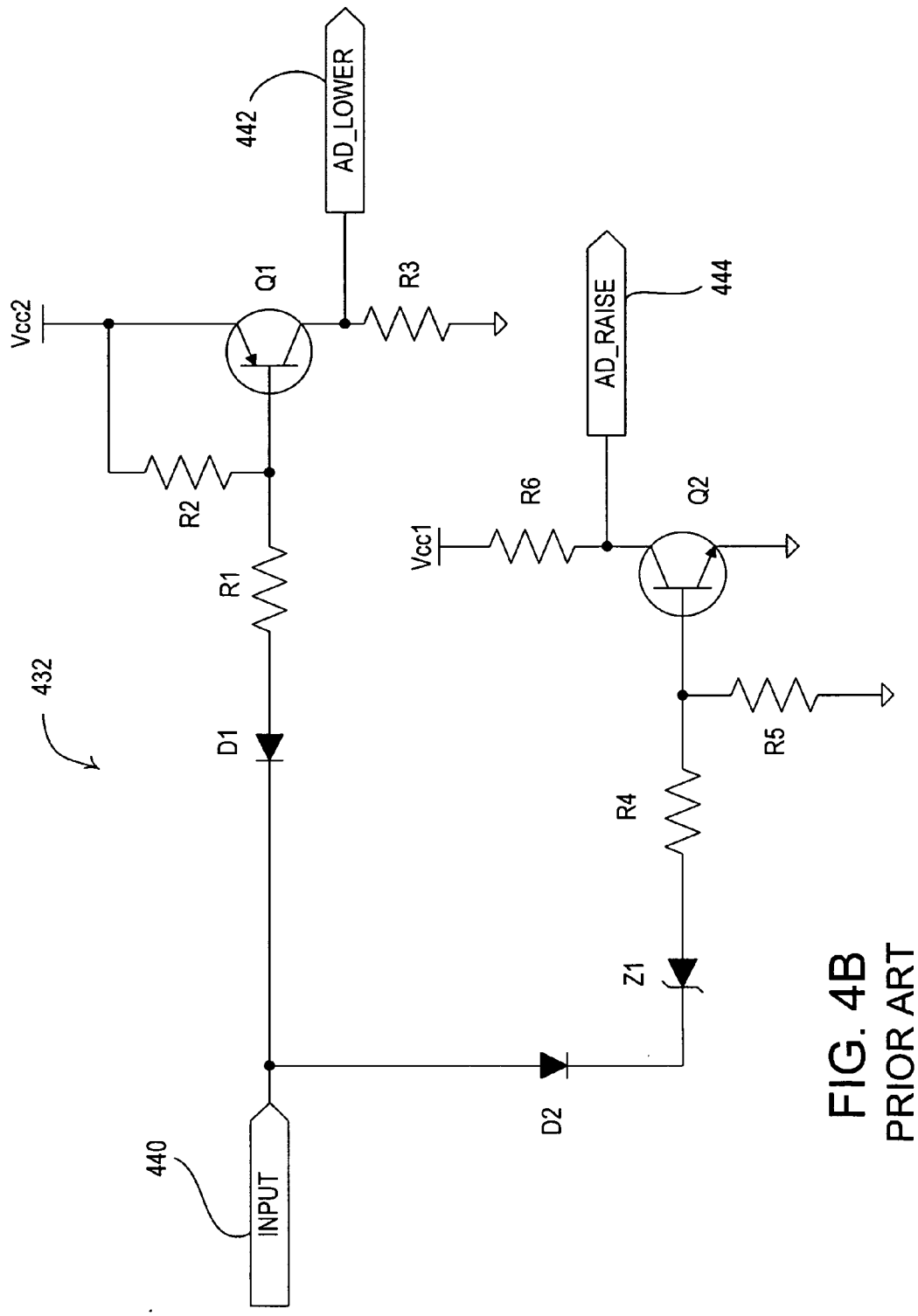
FIG. 4B is a schematic representation of the signal detector of the dimmer switch of FIG. 4A.

The electrical schematic of the smart three-way dimmer switch 502 is exactly the same as the electrical schematic for the prior art smart three-way dimmer switch 202 shown in FIG. 4A. Because of the operation of the three-way switch 504, the signal detector 432 of the smart dimmer 502 of the present invention will either provide signals at both outputs AD_RAISE and AD_LOWER simultaneously or no signals at both outputs.

The smart three-way dimmer switch 502 of the present invention has novel operating software running on microprocessor 426 in order to correctly function in system 500. Rather than receiving a signal at the AD terminal that is a short pulse (100-200 milliseconds) representing a closure of one of the momentary switches T', R', L' in remote switch 204, the smart three-way dimmer switch 502 determines when the voltage at the AD terminal changes states (i.e., from an AC line voltage signal to zero volts, and vise versa). Based on this determination, the smart three-way dimmer switch 502 toggles the state of the lighting load 508. The smart three-way dimmer switch 502 may also toggle the state of the lighting load 508 in response to an actuation of actuator 316 (or a similar actuator) on the user interface.

Figure 6:
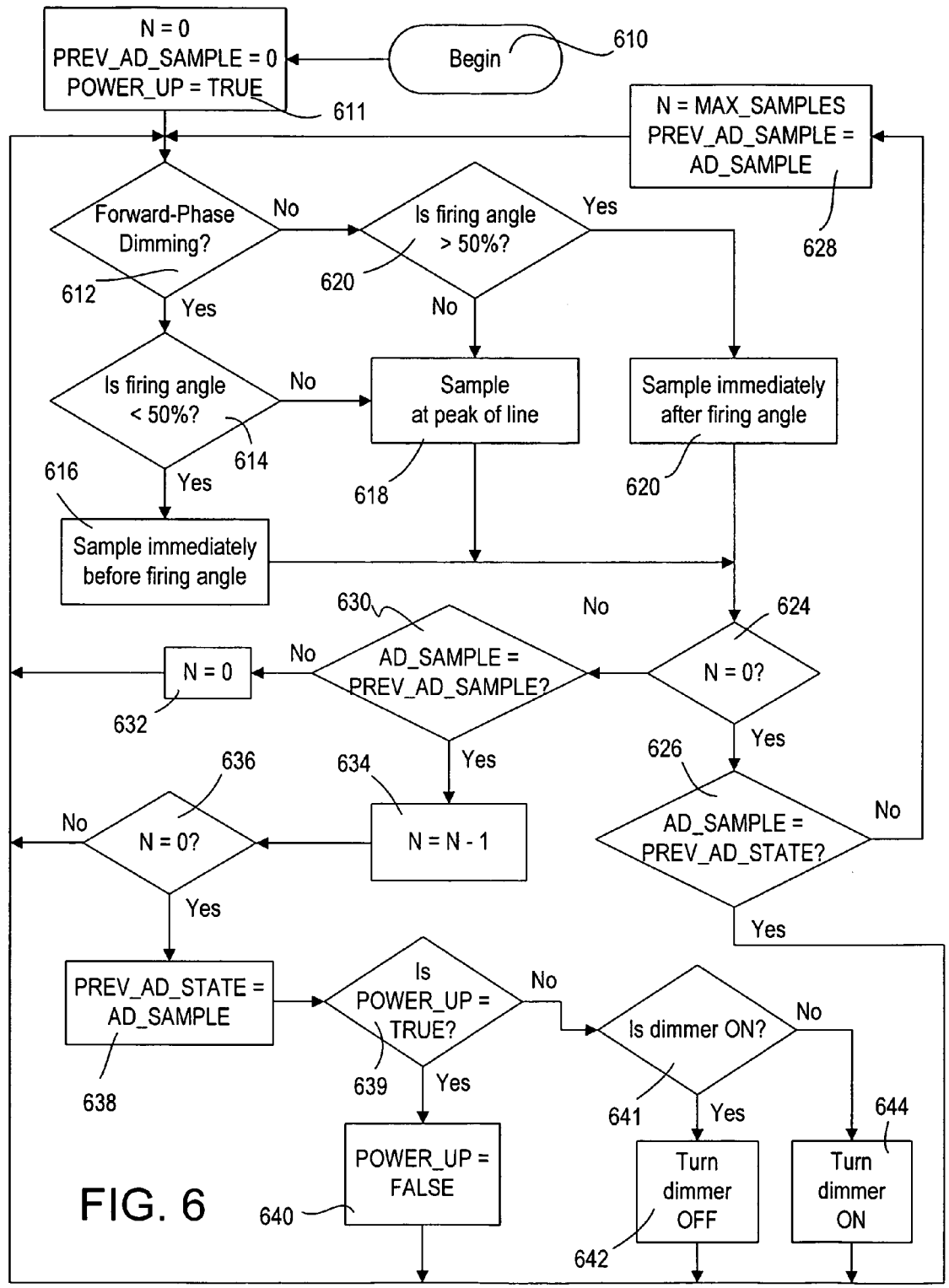
FIG. 6 is a flowchart of the process for monitoring the AD terminal of the dimmer switch of the three-way dimmer switch system of FIG. 5.

A flowchart summarizing the novel method for monitoring the AD terminal of the smart three-way dimmer 502 is shown in FIG. 6 and begins at step 610. First, two variables N and PREV_AD_SAMPLE are initialized to zero and a third variable POWER_UP is initialized to TRUE at step 611.

Next, at step 612, the microprocessor 426 samples the outputs of the signal detector 432 (that are representative of the voltage at the AD terminal) when the FETs 420, 422 are non-conducting. Preferably, the sampling should occur at or near the peak of the AC power source voltage in order to minimize the effect of noise on the sampling process. Often, AC power sources are influenced by sources of noise, which comprise a greater percentage of the AC power source voltage near the zero-crossings of the waveform, i.e., when the instantaneous voltage is small. Thus, the smart three-way dimmer attempts to sample the outputs of the signal detector near the peak of the AC power source voltage to avoid incorrect values being sampled.

At step 612, a determination is made as to whether the smart three-way dimmer is operating with forward-phase control dimming or reverse-phase control dimming. If the dimmer is operating with forward-phase control dimming (i.e., the FETS are non-conducting at the beginning of each half-cycle), the process moves to step 614. If the firing angle of the dimmer is less than 50% (i.e., the FETs begin conducting before the peak of the line voltage), then the FETs are only non-conducting for a short period of time at the beginning of each half-cycle and the sampling occurs immediately before the firing angle at step 616. If the firing angle of the of the dimmer is greater than or equal to 50% (at step 614), then the sampling occurs at the peak of the AC power source voltage at step 618. If the determination is made at step 612 that the dimmer is operating with reverse-phase control dimming (i.e., the FETs are conducting at the beginning of each half-cycle), the process moves to step 620. If the firing angle of the dimmer is greater than 50% (i.e., the FETs cease conduction after the peak of the line voltage), then the FETs are only non-conducting for a short period of time at the end of each half cycle and the outputs of the signal detector must be sampled immediately after the firing angle at step 620. Otherwise, the sampling occurs at the peak of the line at step 618. The result of the sampling process is stored in a variable AD_SAMPLE, which represents either one of the two states of the three-way switch 504.

Next, the microprocessor determines whether the variable AD_SAMPLE is different than the previous state of the AD terminal (PREV_AD_STATE). If MAX_SAMPLES consecutive samples are the same, and are different from the previous state of the AD terminal, then a valid change in the state of the connected three-way switch is detected. A counter N is used to repeatedly sample the AD terminal for a number of times equal to MAX_SAMPLES in order to minimize the effects of switch bouncing at the three-way switch 504 and noise in the AC power source voltage. At step 624, if the value of the counter N is zero, the process moves to step 626. If the present sampled value, AD_SAMPLE, is equal to the previous state of the AD terminal, PREV_AD_STATE, then the process loops back to the beginning. If at step 626, a change is detected at the AD terminal, the counter N is set to MAX_SAMPLES and a variable representing the previous sample of the AD terminal (PREV_AD_SAMPLE) is set to the value of the current AD sample at step 628. The process loops back to the beginning to sample another value of the AD terminal.

If at step 624, the value of the counter N is not zero (meaning that a change had been detected at the AD terminal), a "debouncing" process begins. At step 630, if the present sampled value is not equal to the previously sampled value, then MAX_SAMPLES consecutive AD samples did not have the same value and the counter N is set to zero at step 632 and the process loops back to the beginning. However, if the present sampled value is equal to the previous sampled value, then the counter N is decremented at step 634.

If at step 636, the counter N is not equal to zero, meaning that the appropriate number of the same consecutive samples of the AD terminal have not been read, the process loops back to the beginning to sample another value of the AD terminal. On the other hand, if the counter is equal to zero at step 636, then the appropriate number of the same consecutive samples has been read and a change in state of the AD terminal has been determined. The new state of the AD terminal is stored in the variable PREV_AD_STATE at step 638. If the variable POWER_UP is FALSE at step 639, the state of the dimmer and the lighting load (i.e., ON or OFF) must be toggled. If the dimmer is currently ON at step 641, then the dimmer is turned OFF at step 642. Otherwise, the dimmer is turned ON at step 644. After either turning the dimmer OFF or ON, the process loops back to begin sampling again. If the variable POWER_UP is TRUE at step

639, the dimmer has just powered up and the process loop of FIG. 6 is executing for the first time. Thus, the variable POWER_UP is set to FALSE at step 640, and the process loops back to the beginning without toggling the state of the dimmer.

Figure 2:
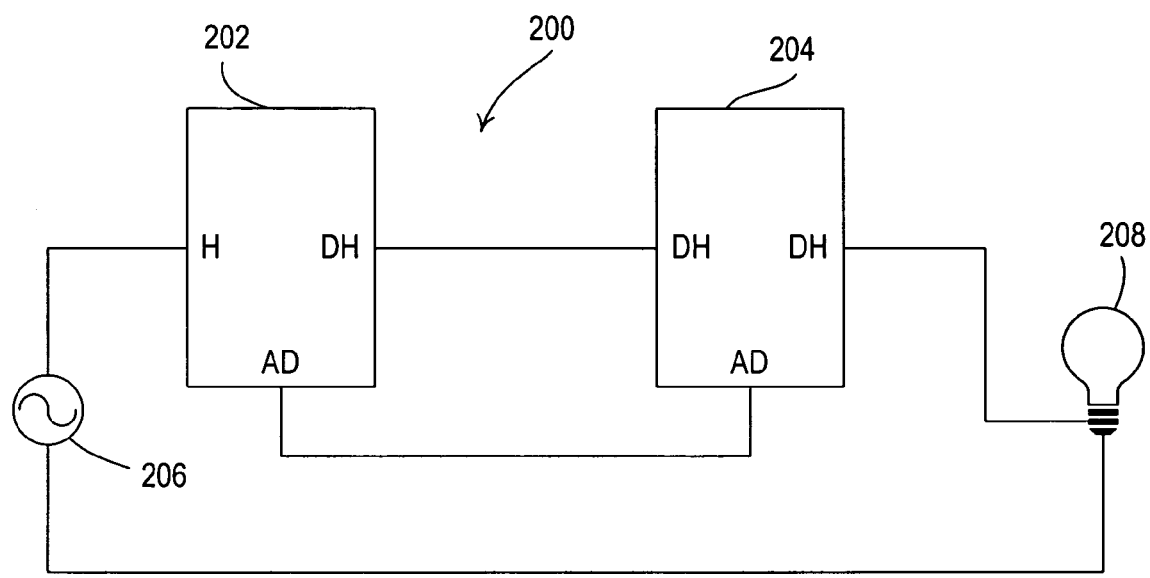
FIG. 2 is a simplified block diagram of a typical prior art multiple location lighting control system.
Figure 3:
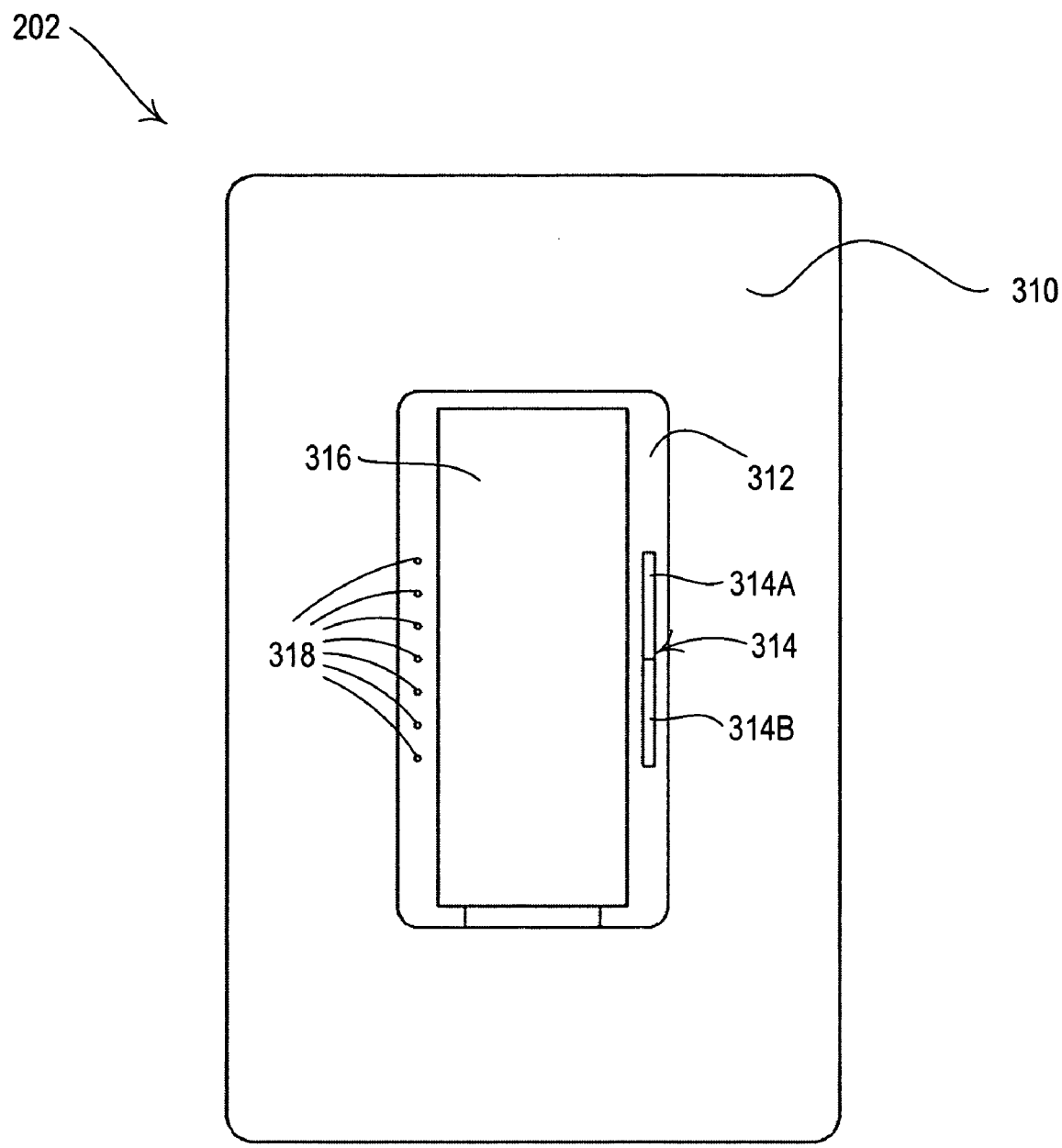
FIG. 3 is a user interface of the dimmer switch of the multiple location lighting control system of FIG. 2.

The dimmer switch 502 can operate in either the three-way dimmer switch system 500 of the current invention or the prior art multiple location lighting control system 200 of FIG. 2. The microprocessor is programmed in a novel manner to determine the nature of the signal at the AD terminal (momentary or maintained) and switch the operation between the two different modes. For example, if the dimmer switch 502 is operating in the manner of the present invention (i.e., a maintained mode of operation) and the microprocessor 426 receives a signal on only one of the two outputs of the signal detector 432 (indicating an actuation of the switch R' or the switch L' of a connected remote switch 204), the dimmer switch will change to a momentary mode operation. In the momentary mode, the dimmer switch will operate in a manner similar to the prior art system 200, in which pulses at the AD terminal represent button presses on the remote switch 204. However, if the dimmer switch 502 is operating in the momentary mode and the microprocessor 426 continues to receive signals at both outputs of the signal detector 432 for longer than a predetermined period of time, the dimmer switch 502 will switch to the maintained mode of operation in which changes in the state of the signal at the AD terminal cause the dimmer to toggle the state of the lighting load. Preferably, the predetermined period of time is approximately 10 seconds, which is appropriately longer than any special button presses that may occur at the user interface of the remote dimmer, such as a long hold for fade-to-off of the lighting load.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A lighting control system for controlling the intensity of a lighting load from a source of AC power, comprising:
    a load control device comprising a first load terminal, a second load terminal, a controllably conductive device coupled between said first load terminal and said second load terminal for controlling the current through said lighting load, and an accessory terminal; said first load terminal, said controllably conductive device, and said second load terminal coupled in series electrical connection for carrying substantially all of said current through and said lighting load; said load control device operable to toggle the lighting load between an ON state in which a current flows through the lighting load as determined by the controllably conductive switch and an OFF state in which substantially no current flows through the lighting load;
    a maintained switch coupled between said accessory terminal and one of said first load terminal and said second load terminal; said maintained switch having a closed state in which said accessory terminal is coupled to said one of said first load terminal and said second load terminal, and an open state in which said accessory terminal is not coupled to said one of said first load terminal and said second load terminal; and
    wherein said load control device is operable to toggle said lighting load when said maintained switch changes between said open state and said closed state.

2. The lighting control system of claim 1, wherein said load control device further comprises an actuator; and wherein actuation of said actuator causes said load control device to toggle said lighting load.

3. The lighting control system of claim 1, wherein said maintained switch is a three-way switch.

4. The lighting control system of claim 1, wherein the load control device comprises a microcontroller.

5. The lighting control system of claim 4, wherein the microprocessor is operable to determine the state of the maintained switch.

6. The lighting control system of claim 1, wherein if said lighting load is in said ON state, said load control device is operable to control said lighting load to said OFF state in response to determining that said maintained switch changed from said open state to said closed state, and in response to determining that said maintained switch changed from said closed state to said open state; and
    if said lighting load is in said OFF state, said load control device is operable to control said lighting load to said ON state in response to determining that said maintained switch changed from said open state to said closed state, and in response to determining that said maintained switch changed from said closed state to said open state.

7. A method for controlling the intensity of a lighting load from a source of AC power in a lighting control system comprising a load control device having a first load terminal, a second load terminal, and an accessory terminal and a maintained switch having a closed state for coupling said accessory terminal to one of said first load terminal and said second load terminal and an open state for decoupling said accessory terminal from said one of said first load terminal and said second load terminal; said method comprising the steps of:
    storing a previous state of said maintained switch;
    detecting a present state of said maintained switch;
    comparing said present state with said previous state of said maintained switch; and
    toggling said intensity of said lighting load between an ON state and an OFF state in response to the result of the step of comparing.

8. The method of claim 7, further comprising the steps of:
    generating a first control signal in response to determining that said maintained switch is in said closed state during a positive half-cycle of said source; and
    generating a second control signal in response to determining that said maintained switch is in said closed state during a negative half-cycle of said source.

9. The method of claim 8, further comprising the steps of:
    determining that said maintained switch is in said closed state in response to the presence of both said first and second control signals; and
    determining that said maintained switch is in said open state in response to the absence of both of said first and second control signals.

10. The method of claim 9, further comprising the step of:
    changing to a momentary mode of operation in response to the presence of only one of said first and second control signals.

11. The method of claim 7, further comprising the steps of:
    determining whether said maintained switch changed from said open state to said closed state; and
    determining whether said maintained switch changed from said closed state to said open state.

12. The method of claim 11, wherein the step of toggling said lighting load further comprises the steps of:
- if said lighting load is in said ON state, controlling said lighting load to said OFF state in response to the step of determining that said maintained switch changed from said open state to said closed state;
- if said lighting load is in said ON state, controlling said lighting load to said OFF state in response to the step of determining that said maintained switch changed from said closed state to said open state;
- if said lighting load is in said OFF state, controlling said lighting load to said ON state in response to the step of determining that said maintained switch changed from said open state to said closed state; and
- if said lighting load is in said OFF state, controlling said lighting load to said ON state in response to the step of determining that said maintained switch changed from said closed state to said open state.

13. The method of claim 7, further comprising the steps of:
- operating in a momentary mode of operation;
- subsequently determining whether said maintained switch has been in said closed state for a predetermined amount of time; and
- changing to a maintained mode of operation in response to the step of determining prior to the steps of storing, detecting, comparing, and changing.

14. The method of claim 13, wherein said predetermined amount of time is approximately ten seconds.

15. A load control device for controlling the intensity of a lighting load from a source of AC power and operable to be coupled to a maintained switch, said load control device comprising:
- a first load terminal adapted to be coupled to said source of AC power;
- a second load terminal adapted to be coupled to said lighting load;
- an accessory terminal adapted to be coupled to said maintained switch, such that when said maintained switch is in a closed state, said accessory terminal is coupled to one of said first load terminal and said second load terminal, and when said maintained switch is in an open state, said accessory terminal is not coupled to either of said first load terminal and said second load terminal;
- a controllably conductive device coupled between said first load terminal and said second load terminal for controlling the amount of current flowing through said lighting load; and
- a microcontroller coupled to said controllably conductive device for controlling said lighting load between an ON state in which a current flows through said lighting load and an OFF state in which substantially no current flows through said lighting load, and operable to determine whether said maintained switch has changed between said open state and said closed state, said microcontroller operable to control said lighting load between the ON state and the OFF state in response to determining that said maintained switch has changed between said open state and said closed state.

16. The load control device of claim 15, further comprising:
- a signal detector coupled to said microcontroller and said accessory terminal, said signal detector operable to determine the state of said maintained switch and to provide a control signal representative of the state of said maintained switch to said microcontroller.

17. The load control device of claim 16, wherein said signal detector is operable to provide a first control signal to said microcontroller in response to detecting current flowing through said accessory terminal in a positive half-cycle of said source, and to provide a second control signal to said microcontroller in response to detecting current flowing through said accessory terminal in a negative half-cycle of said source.

18. The load control device of claim 17, wherein said microcontroller is operable to determine that said maintained switch is in said closed state in response to receiving both of said first control signal and said second control signal, and to determine that said maintained switch is in said open state in response to receiving neither said first control signal nor said second control signal.

19. The load control device of claim 18, wherein said microcontroller is operable to change to a momentary mode of operation in response to detecting only one of said first control signal and said second control signal.

20. The load control device of claim 15, wherein said signal detector is operable to determine that said maintained switch is in said closed state in response to detecting current flowing through said accessory terminal, and to determine that said maintained switch is in said open state in response to detecting no current flowing through said accessory terminal.

* * * * *